United States Patent [19]

Stanley

[11] 4,254,738
[45] Mar. 10, 1981

[54] NO TANGLE PET BRUSH

[76] Inventor: Ada L. Stanley, 4446 S. Lindbergh Blvd., St. Louis, Mo. 63127

[21] Appl. No.: 69,705

[22] Filed: Aug. 27, 1979

Related U.S. Application Data

[63] Continuation-in-part of Ser. No. 837,368, Sep. 28, 1977, abandoned, which is a continuation-in-part of Ser. No. 598,433, Jul. 23, 1975, abandoned.

[51] Int. Cl.³ .............................................. A01K 13/00
[52] U.S. Cl. ...................................... 119/83; 132/112; 401/190
[58] Field of Search ...................... 119/83, 156; 132/9, 132/85, 112; 401/190

[56] References Cited

U.S. PATENT DOCUMENTS

| 1,584,107 | 5/1926 | Livesay | 401/190 |
| 1,596,358 | 8/1926 | Jones | 401/190 |
| 3,231,923 | 2/1966 | Gaines | 401/190 |

Primary Examiner—Hugh R. Chamblee

[57] ABSTRACT

A pet brush has a L-shaped case with a partially hollow interior for housing a container of grooming solution, the container having a spray attachment for spraying the grooming solution into a chamber which provides means for equally distributing the solution across the full bristle pattern of a brush attached to an angled extension of the brush case. The brush bristles have inner ends which are mounted in the case and which extend into the chamber, the inner ends being suitably mounted to provide means for the flow of solution out of the chamber and onto the individual strands of bristles. A removable end cap is provided for removing and replacing the container of grooming solution and the case has an external operator extending into the interior for operating push button types of spray attachments. A wire slicker brush or any other suitable brush may be used and interchanged by snaps or slide structure as is known in the art.

10 Claims, 4 Drawing Figures

U.S. Patent     Mar. 10, 1981     4,254,738
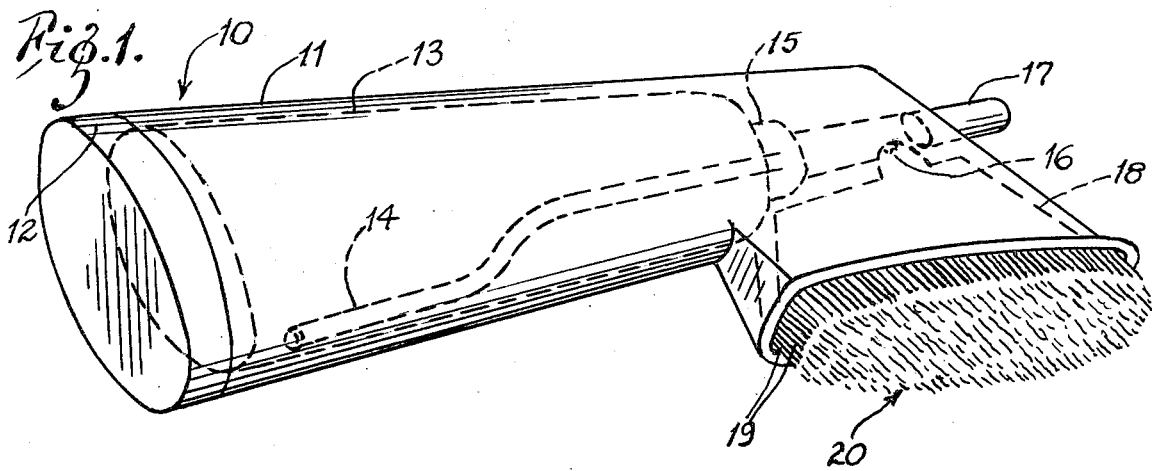
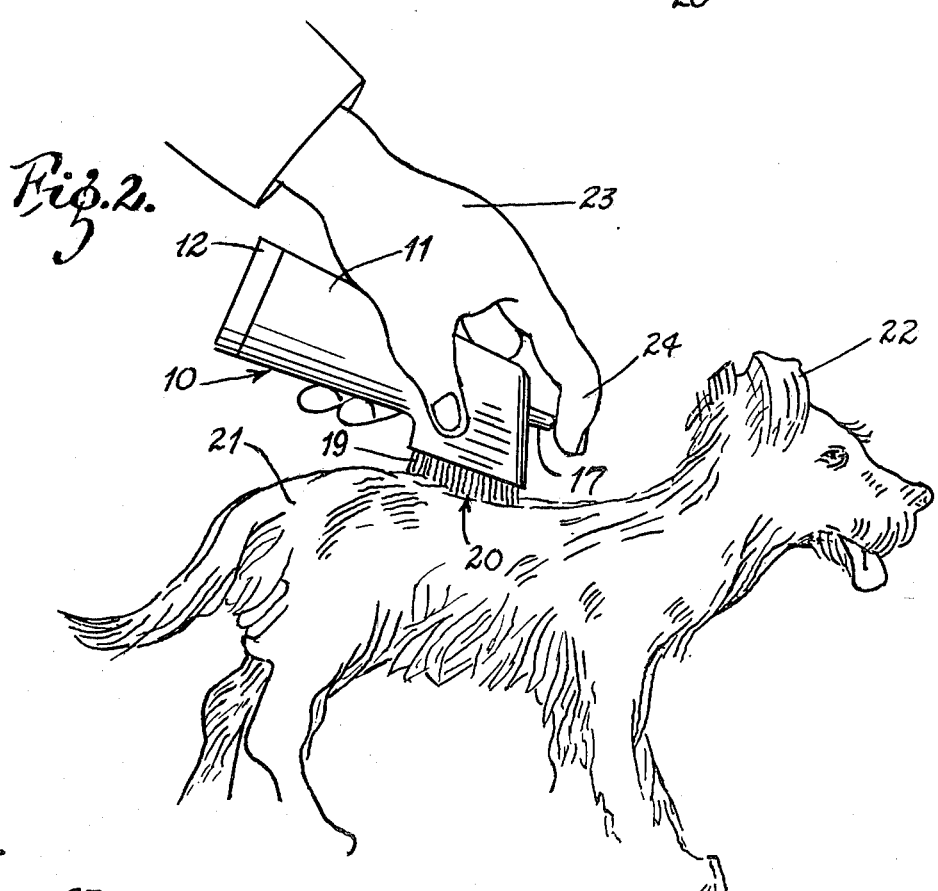
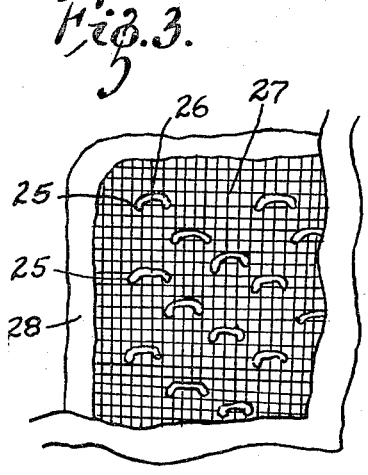
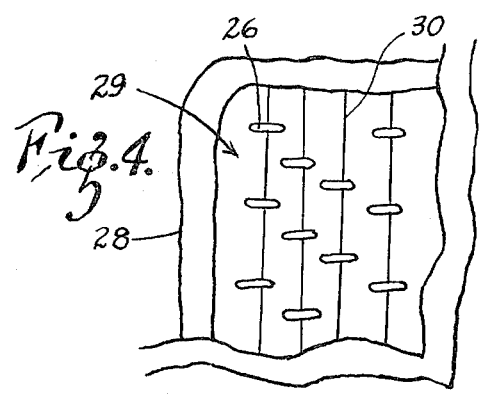

NO TANGLE PET BRUSH

BACKGROUND AND SUMMARY

This is a continuation-in-part of U.S. patent application Ser. No. 837,368 filed Sept. 28, 1977, which is a continuation-in-part of U.S. patent application Ser. No. 598,433 filed July 23, 1975, both now abandoned.

As any dog owner can attest it is generally very difficult to groom and detangle the wet hair of a dog after it has been washed. Usually, the dog is very lively and in a boisterous mood and wet dog hair is much more difficult to brush out than human hair. A dog's hair is usually much thicker and, if curly, curls in much tighter curls than human hair, as for example with poodles. The usual procedure followed to handle a dog that has just had a shampoo is to apply a detangling solution to an area of the animal and then use a brush or comb to work the solution into the nap of the hair to detangle and groom it. There are various types of detangling solutions available, including one manufactured by Hartz Mountain known as Tangle Free. ®

However, this procedure has several drawbacks. For one, there is no way to insure that the proper amount of detangling solution is applied to the various parts of the dog's hair or even to judge the proper amount to be applied as different amounts should be used depending upon how difficult it is to work the hair. The proper amount can only be judged as the solution is worked into the hair and the results assessed by the groom during the combing out process. Another problem is that the animal is usually in a lively mood as it has just had a shampoo, is dripping wet, and is usually being groomed by an unfamiliar person. Therefore, the groom must use one hand to steady the dog and guard against injury either to the groom or the dog. Particularly troublesome are the more nervous and high-strung breeds of dogs as are commonly used for show animals. Unfortunately, the show animals are the ones most in need of frequent shampoos and groomings.

Applicant has succeeded in developing a device which solves all the preceeding problems and has several other advantages which significantly aid the process of grooming a wet animal with a minimum of aggravation to the animal and which provide a professional grooming job in much shortened periods of time. Applicant's device is a combination solution dispenser and brush which smoothly and uniformly applies a detangling solution or other grooming solution over the full face of a brush as the solution is worked into the animal's hair. A specially adapted chamber is provided to guarantee equal application of solution over all the individual brush bristles which extend into the chamber. The solution then flows down each bristle through capillary action, or the effects of surface tension, so that the solution is applied to the hair by the individual bristles.

Applicant's device has a hollow extended case which can be formed to a hand hold which stores the container of solution. The container has a spray nozzle or other spray means which is aligned with the chamber to spray the grooming solution onto the inner ends of the brush bristles. An external operator extends through the top of the case and contacts the spray means so that an index finger can be used to externally operate the spray means. The case extends in an L-shaped manner to accommodate the chamber and provide an extended portion for supporting the brush. The chamber has a short connecting neck and a plenum which flares out rapidly to accommodate the full pattern of the spray. Thusly, the spray is evenly applied across the full bristle pattern described by the inner ends which are fixedly mounted and extend into the chamber. This construction is unique in that it guarantees a uniform distribution of solution across the inner ends of the brush bristles without depending on either gravity flow or the relative viscosity of the solution. Many different types and viscosities of solution can be used which will all be equally applied across the full face of the brush to maximize the efficiency of the brush in applying solution while grooming.

Various sorts of brushes can be used, but applicant has found that a wire slicker brush is particularly adapted for use with dogs as it has relatively long and thick bristles which are separated from each other so as to work themselves into the nap of the hair and to quickly and easily separate the tangles and tight curls normally found in a dog's hair.

Applicant's device may be constructed of any type of lightweight metal or plastic including high impact polystyrenes and its simplicity makes it relatively inexpensive to manufacture. The case can be adapted to receive any standard size spray pump or aerosol bomb of solution and adapting structure can be utilized to permit the use of odd sized containers as well.

BRIEF DESCRIPTION OF THE DRAWINGS

FIG. 1 is a perspective view of the applicant's invention;

FIG. 2 is the side elevation view depicting the use of applicant's device to groom a small dog;

FIG. 3 is an enlarged broken view of the back of the web depicting the bristle ends;

FIG. 4 is an enlarged broken view depicting cross bars located above the bristle ends.

DESCRIPTION OF THE PREFERRED EMBODIMENT

Referring to FIG. 1, applicant's invention of a pet brush 10 has a case 11 which is utilized both as a handle and also to house the other parts of the device and hold them in fixed orientation with respect to each other. The case 11 may be constructed of any light metal such as aluminum or high impact plastic which can be molded to fit the hand or in any other convenient shape. A removable end cap 12 is provided at an end of the case 11 to allow access to the interior of the case 11. A cylinder 13 may be provided which is especially adapted to fit securely within the interior of the case 11. This cylinder 13 may be a refillable pump spray bottle so that a user may merely remove the cylinder 13 from the interior of the case 11, fill the cylinder 13 with any sort of solution desired to be applied, reinsert the cylinder 13 within the case 11 and then replace the end cap 12 to prepare the device for use. In this particular embodiment, an end of a stem 14 may extend down into the interior of the cylinder 13 and the other end may extend upwardly into a neck 15 which collects the solution drawn up through the stem 14 and which then feeds it into a spray device 16. The spray device 16 may be any sort of spray mechanism including the pump sprayers which do not rely upon a pressurized container for their operation. Similarly aerosol bombs or other types of pressurized spray containers may be used in place of the refillable cylinder 13 and its spray mechanism consisting of a stem 14, a neck 15, and a sprayer 16. Additional structure (not shown) may be provided which consists of platforms and sleeves which can be used to adapt the size of the interior of the case 11 for use with odd shaped containers of grooming solutions.

An external operator 17 is provided at the top of the case 11 which extends down into the case 11 interior to operate the spray device 16 of any cylinder 13 placed into the case 11. The spray device 16 communicates with a chamber 18 which extends from the sprayer 16 to the outer end of the case 11. Chamber 18 provides a direct communication between the sprayer 16 and the inner ends of bristles 19 which are fixedly mounted and extend into the chamber 18. Chamber 18 has a connecting neck which extends between the spray device 16 and the main body of the chamber 18 or plenum. The plenum flares outwardly from the connecting neck to the end of the case 11 where the inner ends of bristles 19 are mounted. This arrangement provides for an even distribution of solution across the entire bristle 19 pattern without relying on gravity or brush 10 motion. The brush 20 may be any type of brush including a wire slicker brush which applicant has found to be particularly successful in detangling the wet hair of various breeds of dogs.

A wire slicker brush 20 is characterized by individual strands of thin wire for bristles 19 which extend into the case, as at 25, but are not sealed therein. Each strand of wire has an inner end shaped like a knee 26 which passes through a supporting web 27 or other structure which allows it to pivot back and forth during use. A collar 28 secures the web 27 which is snapped in place inside the chamber 18 with tabs or the like as is known in the art. This is best shown by FIG. 3.

The bristles 19 may be secured to web 27 in a variety of ways. One such way, depicted in FIG. 4, is to provide a second web 29 which is also secured in position by the collar 28. Second web 29 has a plurality of crossbars 30 which contact the knees 26 of bristles 19, continuously urge them against first web 27, and thereby prevent them from retracting into the chamber 18 when the brush 20 is used. Crossbar 30 may be constructed of stainless steel, aluminum, or any similar material including plastic or the like. Second web 29 allows the bristles 19 to pivot back and forth, but does not impede the uniform flow of the solution on to the knee 26 and thus the inner ends of bristles 19. An alternate method (not shown) is to anchor the knee 26 directly to the web 27, while leaving the knee 26 exposed to the chamber 18 such that the flow of the solution onto the knee 26 is not impeded.

Thus, the wire slicker brush 20 allows the user to rapidly move the brush back and forth over an animal while grooming in only one direction as the bristles 19 are forced down during the return stroke. This is the ideal stroking required to quickly and efficiently detangle the wet coat of fur or hair on most breeds of show dogs. The wire slicker brush is also particularly adapted for the uniform flow of solution through the chamber 18, onto the knee 26, and to the brush 20, as the bristles 19 do not swell by absorbing the solution which would tend to limit the flow of solution out into the brush 20.

The flow of solution may be continually adjusted for the thickness of the dog's hair as well as the speed of grooming by altering the frequency of operation of the external operator 17. Thus, if a dog has particularly tight or fine hair and is particularly wet so that the groomer must work at a slower speed, the external operator 17 may be continually pressed by the user to insure a maximum flow of solution onto the bristles 19 and into the dog's hair. This will allow a quick build up of solution on the dog and allow the groomer to work over a large area very quickly.

It should be noted that other types of grooming brushes 20 having different bristles 19 may be used at the option of the groom by merely snapping off the brush 20 and snapping on the desired type of brush 20, as is known in the art.

Typical operation of the device is shown in FIG. 2. As the brush 20 is stroked across the fur coat 21 of a dog 22 or other household pet, the same hand 23 that holds the brush 10 also provides the finger 24 which depresses the external operator 17 and sprays the grooming solution onto the brush bristles 19. The other hand (not shown) is used to steady the animal and hold it in position on a table top or other preparation area. Although the animal 22 is depicted as being in a relatively contented mood, after a very short period of time any animal will become tempermental and object to the groom's continual stroking with a brush 20. Therefore, it is a particular advantage of applicant's brush 10 that one hand is left free to steady and restrain the animal while the other hand is used in applying a uniform and constant flow of detangling or other grooming solution onto the dog's hair.

There are many changes and modifications which can be made to applicant's device which would be obvious to one of ordinary skill in the art, and which are included in the scope of applicant's invention. It is intended that applicant's invention be limited only by the scope of the claims appended hereto.

What is claimed is:

1. A brush for grooming hair comprising a case, means defining a chamber in said case, a first web, means securing said web to said chamber, said brush having a plurality of bristles, means supporting the inner ends of the brush bristles in the first web, each of said inner ends extending through said first web and into said chamber, means in the case for containing a treating solution, and spray means in said containing means for evenly distributing the treating solution across the first web and thereby across the inner ends of the brush bristles.

2. The device of claim 1 wherein the means for supporting the inner ends of the brush bristles in the first web includes a second web, said second web comprising a plurality of crossbars.

3. The device of claim 1 wherein the chamber includes means defining a neck connecting said chamber with the spray means, the chamber having an entrance substantially larger than the spray means and diverging walls so that the treating solution may be sprayed directly on all the inner ends of the brush bristles and said surrounding first web.

4. The device of claim 1 wherein the means for containing the treating solution includes a hollow refillable container.

5. The device of claim 1 wherein the spray means includes a push button operated sprayer to control and adjust the flow of the treating solution.

6. The device of claim 1 wherein the case is constructed of molded plastic, the containing means includes a refillable reservoir, and the spray distributing means includes a push button operated sprayer and means for conducting the treating solution from said refillable reservoir and to said push button operated sprayer.

7. The device of claim 6 wherein the case has a removable end cap on an end of the case whereby the reservoir may be removed from the case.

8. The device of claim 1 wherein the brush is a wire slicker brush.

9. The device of claim 1 wherein the inner end of each bristle is formed into a knee and wherein the bristle supporting means includes a second web, said second web having a plurality of crossbars, said crossbars contacting said knees and urging them against the first web.

10. The device of claim 6 further comprising an external operator extending through said case and aligned with said push button operated sprayer so that said push button operated sprayer may be operated by said external operator from outside said case and while said brush is being used.

* * * * *